(12) United States Patent
Box et al.

(10) Patent No.: US 6,374,592 B1
(45) Date of Patent: Apr. 23, 2002

(54) TURBINE ENGINE WITH SOLID FUEL STARTER

(75) Inventors: John William Box, Coral Gables; Alberto Francisco Araujo, Miramar, both of FL (US)

(73) Assignee: Locust USA, Inc., Miami, FL (US)

( * ) Notice: Subject to any disclaimer, the term of this patent is extended or adjusted under 35 U.S.C. 154(b) by 0 days.

(21) Appl. No.: 09/612,162

(22) Filed: Jul. 7, 2000

(51) Int. Cl.$^7$ ................. F02C 7/26; F02C 3/26
(52) U.S. Cl. ............ 60/39.02; 60/39.141; 60/39.142; 60/39.464
(58) Field of Search .............. 60/39.464, 39.02, 60/39.141, 39.142; 149/19.2, 19.1

(56) References Cited

U.S. PATENT DOCUMENTS

| | | | |
|---|---|---|---|
| 2,457,833 A | 1/1949 | Redding | 60/49 |
| 2,559,006 A | 7/1951 | Clapham | 60/41 |
| 2,620,627 A | 12/1952 | Nardone | 60/39.47 |
| 2,640,315 A | 6/1953 | Secord | 60/35.6 |
| 2,811,829 A | 11/1957 | Topinka | 60/35.6 |
| 2,842,937 A | 7/1958 | Clark | 60/39.14 |
| 2,917,894 A | 12/1959 | Fox | 60/35.6 |
| 2,960,824 A * | 11/1960 | Plummer | 60/39.14 |
| 2,984,976 A | 5/1961 | Volk | 60/39.14 |
| 2,985,104 A | 5/1961 | Fox | 102/39 |
| 2,986,879 A | 6/1961 | Volk | 60/39.14 |
| 3,017,748 A | 1/1962 | Burnside | 60/35.6 |
| 3,032,970 A | 5/1962 | Fox | 60/35.3 |
| 3,238,721 A | 3/1966 | Brandes | 60/39.75 |
| 5,010,728 A * | 4/1991 | Joy | 60/39.464 |
| 5,063,735 A | 11/1991 | Colgren | 60/246 |
| H1007 H | 1/1992 | Schadow | 60/210 |
| 5,131,223 A | 7/1992 | Owen | 60/263 |
| 5,343,690 A * | 9/1994 | Shekleton et al. | 60/39.02 |
| 6,039,819 A * | 3/2000 | Harrod et al. | 149/19.2 |

* cited by examiner

*Primary Examiner*—Charles G. Freay
(74) *Attorney, Agent, or Firm*—David P. Gordon; David S. Jacobson; Thomas A Gallagher

(57) ABSTRACT

A quantity of solid fuel is attached to the inside of the combustion chamber of the turbine. When the engine begins a starting sequence, a starter begins spinning the compressor and an air flow is pumped through the engine. The solid fuel is then heated by a heater element until the solid fuel begins to burn. The combustion of the solid fuel increases the temperature of the combustion chamber so that when, thereafter, an atomized or vaporized liquid fuel is injected, the temperature within the combustion chamber is sufficient to allow the liquid fuel to burn in a self-sustaining manner.

19 Claims, 2 Drawing Sheets

TURBINE ENGINE WITH SOLID FUEL STARTER

BACKGROUND OF THE INVENTION

1. Field of the Invention

This invention relates broadly to turbine engines, and more particularly, to starters for turbine engines.

2. State of the Art

In a turbine jet engine, air is taken in from the outside, compressed, heated by the combustion of fuel, and then expanded in a turbine. The air is expelled from the engine through an exhaust pipe at a much higher velocity than the intake velocity, thereby creating a propulsive force. A turbine jet engine generally includes a compressor which draws air into the engine and compresses it into a combustion chamber. Vaporized (or atomized) liquid fuel, e.g., diesel or Jet A kerosene, is injected into the combustion chamber and heated to cause a self-sustaining burn. The burn causes a rise in temperature in the combustion chamber which increases the pressure of the air in the combustion chamber, which is then expanded through a turbine and expelled through the exhaust pipe at the rear of the engine. The turbine absorbs the necessary energy from the expanded high velocity air to power the compressor, with the greater part of the energy utilized to develop propulsive thrust.

Turbine engines, especially relatively small engines, can be difficult to start. One reason for this is that the dwell time of the fuel/air mixture in the combustion chamber is extremely short. As a consequence, there is little time to heat the liquid fuel to a temperature hot enough to self-sustain a flame.

SUMMARY OF THE INVENTION

It is therefore an object of the invention to provide a system for sustaining the combustion of a liquid fuel injected into a turbine engine upon starting the turbine engine.

It is another object of the invention to provide a system which rapidly increases the temperature of a combustion chamber of the turbine engine to a temperature high enough to allow the liquid fuel to be consumed in a self-sustaining manner.

In accord with these objects, which will be discussed in detail below, a turbojet engine is provided which includes a housing having a forward inlet nozzle, an aft exhaust pipe, and a combustion chamber therebetween. The aft exhaust pipe preferably includes a variable area nozzle to optimize engine performance. The engine also includes a compressor between the inlet nozzle and the combustion chamber, and a turbine between the combustion chamber and the exhaust pipe. A shaft couples the compressor and the turbine together such that rotation of the turbine cause rotation of the compressor. A liquid fuel injector and atomizer (or vaporizer) is provided to inject atomized (or vaporized) fuel into the chamber for combustion therein. In addition, a solid fuel element and a heater element to ignite the solid fuel is provided in the chamber.

When the engine begins a starting sequence, a starter begins spinning the compressor and an air flow is pumped through the engine. The solid fuel element is then heated by the heater element until the solid fuel begins to burn. The combustion of the solid fuel increases the temperature of the combustion chamber so that when, thereafter, a liquid fuel is injected and atomized, the temperature within the combustion chamber is sufficient to allow the liquid fuel to burn in a self-sustaining manner.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
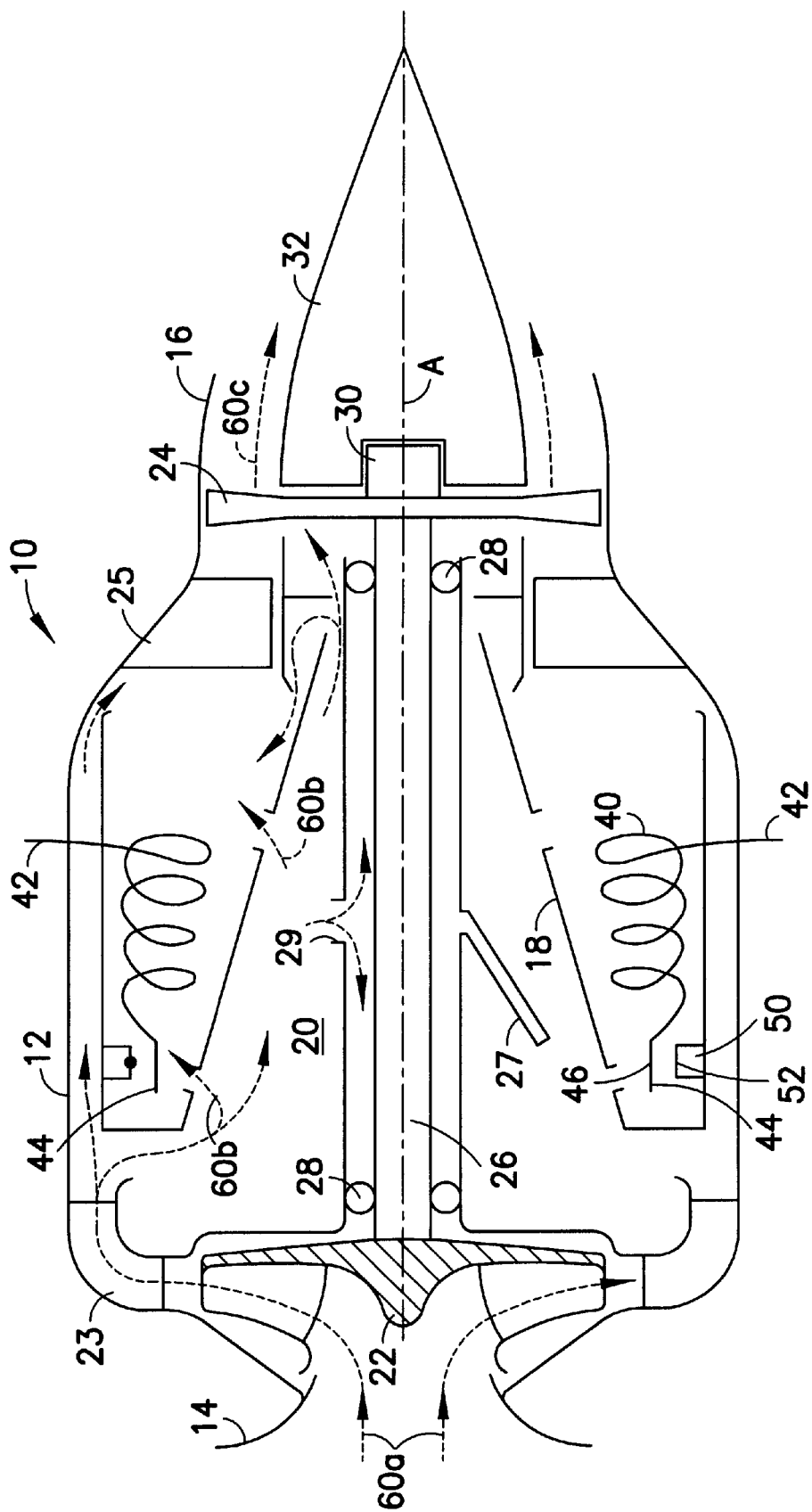
FIG. 1 is a schematic section of a turbine engine according to the invention.

Turning now to FIG. 1, a turbine engine 10 according to the invention is shown. The turbine engine 10 includes a housing 12 defining a longitudinal axis A, a forward inlet nozzle 14, an aft exhaust pipe (nozzle) 16, and a combustion chamber 20 therebetween. The combustion chamber 20 includes a hollow, perforate piece of metal 18 (or can) having an interior surface. In addition, the engine 10 includes a compressor wheel (a compressor) 22 and compressor diffuser 23 provided between the inlet nozzle 14 and the combustion chamber 20, and a turbine diffuser blade 25 and turbine 24 provided between the combustion chamber 20 and the exhaust pipe 16. A shaft 26 rotatably mounted on a ballrace 28 couples the compressor 22 and the turbine 24 together such that rotation of the turbine cause rotation of the compressor. An oil conduit 27 provides a lubricant to the ballrace 28. Additionally, air enters the ballrace 28 through an entry 29. An electric starter 30 is coupled to compressor 22 to spin the compressor on starting the engine. A preferably axially adjustable flow stabilizer 32 is provided within the exhaust pipe 16.

A vaporizer 40, having an inlet 42 and an exit 44 and adapted to vaporize liquid fuel flowing therethrough, is provided within the hollow walls of the can 18.

According to the invention, one or more solid fuel elements 50 are provided at or near the exit 44 of the vaporizer 40. Preferred solid fuels include castable and curable urethane rubber-like compounds. Optionally, a solid oxidizer and preferably also solid stabilizers (to limit unintended combustion) may be mixed with the solid fuel to facilitate ignition of the solid fuel. Preferably, if a solid oxidizer is added, in order to maximize safety and the energy content of the fuel, the solid fuel/oxidizer mixture is such that the mixture will not burn in a vigorous manner until the extra oxygen provided by the starter spinning the compressor is present. Examples of solid oxidizers include perchlorate and nitrate compounds. Examples of solid stabilizers are finely powdered aluminum, magnesium, and carbon. An igniter 52 is positioned to ignite the solid fuel 50.

In operation, the starter 30 is operated to spin the compressor 22 and air 60a begins to enter the can 18 and the combustion chamber 20. The solid fuel 50 is then heated by the igniter 52 until the solid fuel begins to burn and continues to burn because of the air flow 60b within the can 18. The burning of the solid fuel 50 conductively heats the can 18 and the combustion chamber 20. As such, when a vaporized liquid fuel, e.g., diesel fuel or Jet A kerosene, is injected into the can, the temperature is high enough to allow the liquid fuel to sustain itself in a stable, constant, burn before the solid fuel is completely consumed. The burn of the liquid fuel heats the combustion chamber 20 and the compressed air within, and the heated, high pressure air 60c is expelled through the exhaust pipe 16 at the aft end of the engine. The turbine 24 absorbs the necessary energy from the expelled gases to power the compressor 22, with the greater part of the energy utilized to develop propulsive thrust.

Figure 2:
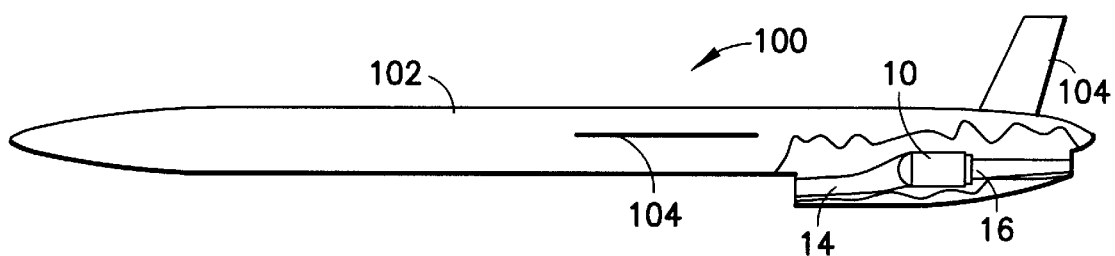
FIG. 2 is a partially broken side elevation of a missile provided with a turbine engine according to the invention.
Figure 3:
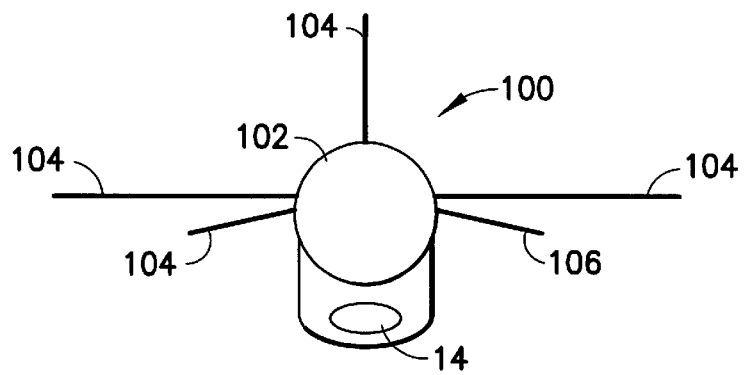
FIG. 3 is a front view of the missile provided with a turbine engine according to the invention.

In each operation, due to the complete consumption of the solid fuel, the engine is particularly suitable for single use turbojet engines, for example, of the type used in missiles. Referring to FIGS. 2 and 3, a missile 100 is shown including a turbojet engine 10 according to the invention. The missile preferably includes a generally cylindrical body 102 and stabilizers (wings) 104. The engine 10 is coupled to, or within, the body 102 of the missile 100. An intake 14 provides air to the engine, and an exhaust pipe 16 is adapted to exhaust the compressed air. The turbojet engine of the invention may also be used in military and civilian passenger-carrying and payload-carrying aircraft or other reusable applications by arranging the solid fuel as a cartridge system and replacing the cartridge after each flight.

There have been described and illustrated herein an embodiment of a turbine engine, and a method of starting a turbine engine. While particular embodiments of the invention have been described, it is not intended that the invention be limited thereto, as it is intended that the invention be as broad in scope as the art will allow and that the specification be read likewise. Thus, while particular materials for the solid fuel and liquid fuel have been disclosed, it will be appreciated that other solid and liquid fuels may be used as well. For example, the solid fuel may be any solid fuel used to power solid fuel rockets. In addition, while a vaporizer is disclosed, it will be appreciated that an atomizer can be used as well. Also, while a compressor wheel is preferred, it will be recognized that other axial compressors such as alternating sets of rotating and stationary compressor blades, a turbofan or a turboprop may alternatively be used. It will therefore be appreciated by those skilled in the art that yet other modifications could be made to the provided invention without deviating from its spirit and scope as claimed.

What is claimed is:

1. A turbine engine, comprising:
   a) a housing having a forward end and an aft end, said forward end including an air inlet and said aft end including an exhaust nozzle;
   b) a combustion chamber within said housing;
   c) a compressor between said air inlet and said chamber which compresses air within said combustion chamber;
   d) a turbine between said combustion chamber and said exhaust nozzle and coupled to said compressor, said turbine being rotated by air moving from said combustion chamber to said exhaust nozzle;
   e) a liquid fuel injector which injects liquid fuel into said combustion chamber;
   f) a solid fuel element in said chamber; and
   g) an igniter coupled to or adjacent said solid fuel element which heats said solid fuel element.

2. A turbine engine according to claim 1, further comprising wherein:
   h) a hollow perforate metallic element in which said fuel injector, said solid fuel element, and said igniter are provided.

3. A turbine engine according to claim 1, wherein:
   said fuel injector includes one of a vaporizer which vaporizes said liquid fuel and an atomizer which atomizes said liquid fuel.

4. A turbine engine according to claim 1, wherein:
   said solid fuel is a urethane compound.

5. A turbine engine according to claim 1, wherein:
   said solid fuel is mixed with an oxidizer.

6. A turbine engine according to claim 5, wherein:
   said oxidizer is one of a perchlorate and a nitrate.

7. A turbine engine according to claim 5, wherein:
   said solid fuel and said oxidizer are mixed with a stabilizer.

8. A turbine engine according to claim 7, wherein:
   said stabilizer is at least one of aluminum, magnesium, and carbon.

9. A turbine engine according to claim 1, further comprising:
   h) a starter which rotates said compressor.

10. A turbine engine according to claim 1, wherein:
    said housing is one of a body of a missile or integral with said body of a missile.

11. A missile, comprising:
    a) a missile body; and
    b) a turbine engine coupled to or integral with said body, said turbine engine having,
       i) a forward end including an air inlet,
       ii) an aft end including an exhaust nozzle,
       iii) a combustion chamber between said air inlet and said exhaust nozzle,
       iv) a compressor between said air inlet and said combustion chamber which compresses air within said combustion chamber,
       v) a turbine between said combustion chamber and said exhaust nozzle and coupled to said compressor, said turbine being rotated by air moving from said combustion chamber to said exhaust nozzle,
       vi) a liquid fuel injector which injects liquid fuel into said combustion chamber, and
       vii) a solid fuel element in said combustion chamber.

12. A method of starting a turbine engine, comprising:
    a) providing a turbine engine having,
       i) a housing having a forward end and an aft end, said forward end including an air inlet and said aft end including an exhaust nozzle,
       ii) a combustion chamber within said housing,
       iii) a compressor between said air inlet and said chamber which compresses air within said combustion chamber,
       iv) a turbine between said chamber and said exhaust nozzle,
       v) a liquid fuel injector which injects liquid fuel into said chamber,
       vi) a solid fuel element in said chamber,
       vii) an igniter which heats said solid fuel, and
       vii) and a starter which initially operates said compressor;
    b) activating said starter to cause said compressor to compress air within said combustion chamber;
    c) activating said igniter to cause said solid fuel to burn such that compressed air within said combustion chamber is heated to a temperature which causes said liquid fuel to burn in a self-sustained manner.

13. A method according to claim 12, wherein:
    said turbine engine further includes a hollow perforate metallic element in which said fuel injector, said solid fuel element, and said igniter are provided.

14. A method according to claim 12, wherein:

said liquid fuel is one of vaporized and atomized prior to burning.

15. A method according to claim 12, wherein:

said solid fuel is a urethane compound.

16. A method according to claim 12, wherein:

said solid fuel is mixed with an oxidizer.

17. A method according to claim 16, wherein:

said oxidizer is one of a perchlorate and a nitrate.

18. A method according to claim 16, wherein:

said solid fuel and said oxidizer are mixed with a stabilizer.

19. A method according to claim 18, wherein:

said stabilizer is at least one of aluminum, magnesium, and carbon.

* * * * *